(12) United States Patent
Nocera

(10) Patent No.: US 9,893,891 B2
(45) Date of Patent: Feb. 13, 2018

(54) IDENTITY VERIFICATION USING KEY PAIRS

(71) Applicant: AT&T Intellectual Property I, L.P., Atlanta, GA (US)

(72) Inventor: Andrew Nocera, Parlin, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 295 days.

(21) Appl. No.: 14/861,104

(22) Filed: Sep. 22, 2015

(65) Prior Publication Data

US 2016/0013942 A1    Jan. 14, 2016

Related U.S. Application Data

(63) Continuation of application No. 14/084,794, filed on Nov. 20, 2013, now Pat. No. 9,166,791.

(51) Int. Cl.
| | | |
|---|---|---|
| *H04L 29/06* | (2006.01) | |
| *H04L 9/32* | (2006.01) | |
| *H04L 9/30* | (2006.01) | |
| *H04L 9/08* | (2006.01) | |
| *H04L 9/00* | (2006.01) | |
| *G06F 21/33* | (2013.01) | |
| *G06F 21/41* | (2013.01) | |

(52) U.S. Cl.
CPC .............. *H04L 9/321* (2013.01); *G06F 21/33* (2013.01); *G06F 21/41* (2013.01); *H04L 9/006* (2013.01); *H04L 9/0861* (2013.01); *H04L 9/30* (2013.01); *H04L 9/3263* (2013.01); *H04L 63/0884* (2013.01); *G06F 2221/2115* (2013.01); *G06F 2221/2117* (2013.01)

(58) Field of Classification Search
CPC . H04L 63/08; H04L 63/0815; H04L 63/0884; H04L 63/0892; H04L 63/062; H04L 9/006; H04L 9/321; H04L 9/0861; H04L 9/30; H04L 9/3263; G06F 21/03; G06F 21/33; G06F 21/41; G06F 2221/2115; G06F 2221/2117; H04W 12/06
USPC ........................................................ 713/155
See application file for complete search history.

(56) References Cited

U.S. PATENT DOCUMENTS

| | | |
|---|---|---|
| 6,243,816 B1 | 6/2001 | Fang et al. |
| 6,643,782 B1 | 11/2003 | Jin et al. |
| 7,404,204 B2 | 7/2008 | Davenport et al. |
| 7,412,720 B1 | 8/2008 | Frey et al. |
| 7,660,880 B2 | 2/2010 | Ting et al. |
| 7,690,025 B2 | 3/2010 | Grewal et al. |
| 7,698,734 B2 | 4/2010 | Kupherstein et al. |
| 8,001,588 B2 | 8/2011 | Wei et al. |
| 8,006,294 B2 | 8/2011 | Kikuchi |
| 8,185,938 B2 | 5/2012 | Benantar |
| 8,261,321 B2 | 9/2012 | Casey et al. |
| 8,291,088 B2 | 10/2012 | Marcus et al. |
| 8,381,271 B2 | 2/2013 | Dingwall et al. |
| 8,505,083 B2 | 8/2013 | Kuzin et al. |
| 8,522,333 B2 | 8/2013 | Leitner |
| 8,528,065 B2 | 9/2013 | Ramos et al. |

(Continued)

*Primary Examiner* — Yogesh Paliwal
(74) *Attorney, Agent, or Firm* — Scott P. Zimmerman, PLLC

(57) ABSTRACT

User identity is verified as a user migrates among different devices. When the user migrates from a device to a different device, key pairs may be generated. If the key pairs validate, the user may be verified to the different device.

20 Claims, 5 Drawing Sheets

(56) References Cited

U.S. PATENT DOCUMENTS

| | | | |
|---|---|---|---|
| 2005/0210253 A1* | 9/2005 | Shigeeda | H04L 9/0863 713/171 |
| 2006/0064463 A1* | 3/2006 | Chan | G06F 21/6218 709/206 |
| 2007/0130462 A1 | 6/2007 | Law et al. | |
| 2008/0034412 A1 | 2/2008 | Wahl | |
| 2010/0174758 A1 | 7/2010 | Radenkovic et al. | |
| 2012/0011578 A1* | 1/2012 | Hinton | H04L 9/3228 726/8 |
| 2012/0096266 A1 | 4/2012 | Fukuda | |
| 2012/0131343 A1 | 5/2012 | Choi et al. | |
| 2012/0210413 A1 | 8/2012 | Akula et al. | |
| 2012/0291114 A1 | 11/2012 | Poliashenko et al. | |
| 2013/0081126 A1 | 3/2013 | Soukup et al. | |

* cited by examiner

IDENTITY VERIFICATION USING KEY PAIRS

CROSS-REFERENCE TO RELATED APPLICATION

This application is a continuation of U.S. application Ser. No. 14/084,794 filed Nov. 20, 2013 and since issued as U.S. Pat. No. 9,166,791, which is incorporated herein by reference in its entirety.

BACKGROUND

Public-key cryptography refers to a cryptographic algorithm which requires the use of a private key and a public key. Although different, the two keys in the key pair are mathematically linked. It is computationally easy for a user to generate his or her public and private key pair and to use them for encryption and decryption. It is computationally infeasible for a properly generated private key to be determined from its corresponding public key. Thus, the public key may be published without compromising security, whereas the private key must not be revealed.

Secure shell authentication (SSH) uses public-key cryptography to authenticate a remote user attempting to access a computer (or server). One conventional approach in SSH is to allow users (or programs) to log into a desired computer without having to specify a password. In this approach, anyone can produce a matching pair of different keys consisting of a public key and a private key. The public key is placed on all computers that must allow access to the owner of the matching private key, where the owner of the private key keeps the private key secret.

SUMMARY

The present disclosure describes a method and apparatus for user identity verification as a user migrates amongst systems, servers, computing environments and/or segments within a cloud computing environment. Specifically, the present disclosure relates to the use of multiple private and public key pairs that are processed as a user migrates amongst the systems, servers, computing environments and/or segments within a cloud computing environment.

As described herein, a user currently accessing a first system seeks to migrate from the first system to a target system. The target system receives a first private key from the first system. The target system already has access to a first public key that corresponds with the first private key. The target system validates whether the user may access the target system based on the first private key and the first public key.

While the target system can validate whether the user can access the target system by utilizing the first private key and the first public key, the target system requests further verification of the user's actual identity by interacting with a second system (hereinafter referred to as "verification system").

The verification system maintains a second public key that is based on an identity of the user. The second public key is inaccessible to the user. The verification system receives a second private key from an initial system associated with the user. Based on the second private key and the second public key, the verification system sends a validation of user identity to the target system.

Prior to the user migrating amongst various systems, the user logs into the verification system from the initial system associated with the user. The verification system generates the second private key and the second public key based on the identity of the user. The verification system transmits the second private key to the initial system and stores the second public key such that the second public key is inaccessible to the user. As the user seeks to access various systems, any system that has determined whether the user has access can request verification of the user's actual identity. Upon receipt of such a request, the verification system receives the second private key from the initial system and validates the user's identity by utilizing the second private key and the second public key that is inaccessible to the user.

By utilizing a plurality of key pairs, where a first key pair corresponds with the user's access rights to the target system and a second key pair corresponds to the user's actual identity, the present disclosure describes a method and apparatus that provides added security by determining whether a user who provides the proper credentials (i.e. the first private/public keys) for accessing a target system is actually a user who should be accessing the target system.

DETAILED DESCRIPTION

Figure 1:
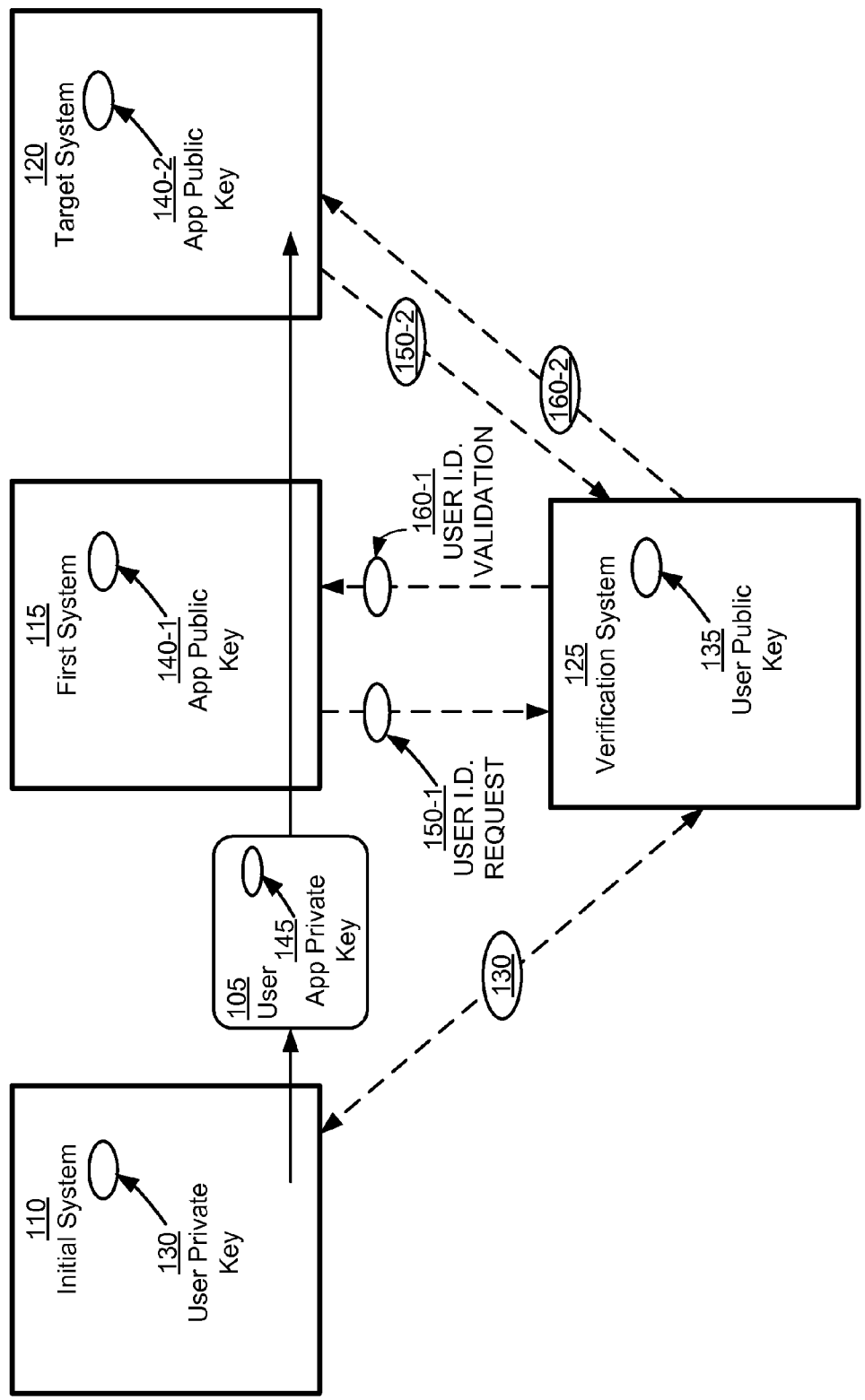
FIG. 1 shows a diagram illustrating a verification system for providing a validation of a user's identity to various systems as the user migrates amongst the various systems in accordance with embodiments described herein.

FIG. 1 shows a diagram illustrating a verification system for providing a validation of a user's identity to various systems as the user migrates amongst the various systems in accordance with embodiments described herein.

FIG. 1 shows an initial system 110 associated with the user 105. The initial system 110 may be a system from which the user 105 logs into a verification systems 125 for a session during which a public/private key pair associated with the user is generated. The verification system 125 generates a user private key 130 and a user public key 135 based on an identity of the user 105.

The verification system 125 stores the user public key 135 such that it is inaccessible to the user 105. For example, the verification system 125 stores the user public key 135 in a secure file system that the user 105 is not allowed to access. The verification system 125 returns the user private key 130 to the initial system 110.

The user 105 migrates from the initial system 110 to a first system 115. For example, the user 105 attempts to log into the first system 115 from the initial system, 110. The first system 115 determines whether the user 105 has access to an application in the first system 115. The first system 115 has access to an application public key 140-1 and the first system receives an application private key 145 from the user 105 (or the initial system 110). The first system 115 processes the application keys 140-1, 145 in order to determine if the user 105 has access to the application. The first system 115 also sends a user identification request 150-1 to the verification system 125 to verify the actual identity of the user 105.

In response to the user identification request 150-1, the verification system 125 requests and receives the user private key 130 from the initial system 110. The verification system 125 processes the user keys 130, 135 in order to validate the user's 105 identity. If the presented user private key 130 cryptographically matches with, binds to, decrypts, or validates the corresponding public key 130 (or vice versa), the verification system 125 transmits a validation of user identity 160-1 to the first system 115.

The user 105 then migrates from the first system 115 to the target system 120. The target system 120 determines whether the user 105 has access to an application in the target system 120. The target system 120 has access to an application public key 140-2 and the target system 120 receives an application private key 145 from the user 105. The target system 120 processes the application keys 140-2, 145 in order to determine if the user 105 has access to the application in the target system 120. The target system 120 also sends a user identification request 150-2 to the verification system 125 to verify the actual identity of the user 105.

In response to the user identification request 150-2, the verification system 125 requests and receives the user private key 130 from the initial system 110. The verification system 125 processes the user keys 130, 135 in order to validate the user's 105 identity. If the user keys 130, 135 match, the verification system 125 transmits a validation of user identity 160-2 to the target system 120. It is understood that, in addition to the validations of user identity 160-1, 160-2, the verification system 125 can also send additional information about the user 105 regarding user attributes, roles, and privileges, such additional information can accompany the validations of user identity 160-1, 160-2.

It is understood that the application key pairs 140-1 & 145 and 140-2 & 145 need not relate to a same type of application and that there can be additional key pairs that are exchanged as well. It is also noted that the application key pairs 140-1 & 145 and 140-2 & 145 can determine access, rights and/or privileges to any software module(s) and/or user accounts in a system.

Figure 2:
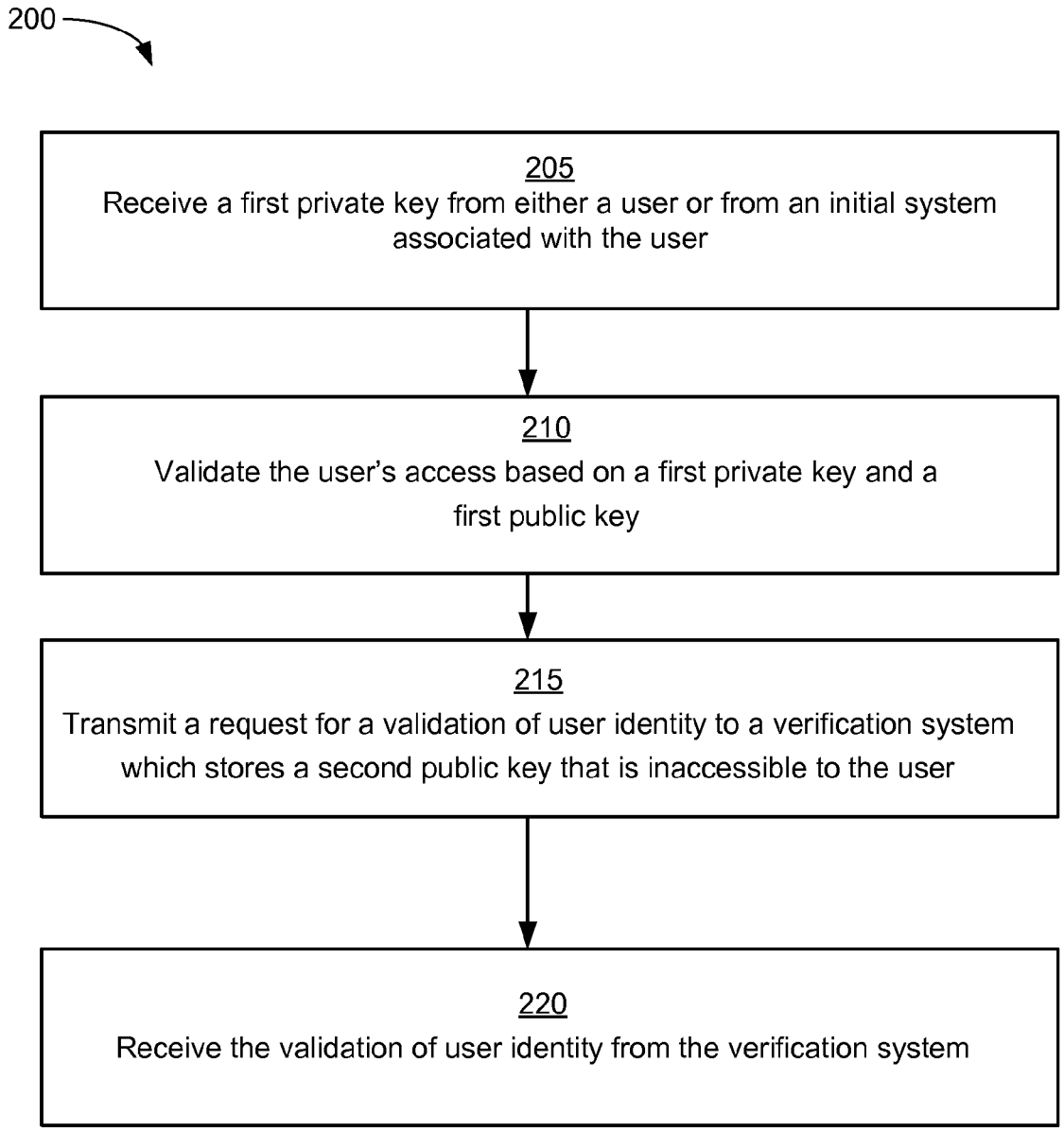
FIG. 2 is a flowchart showing steps performed by a target system receiving a validation of a user's identity in accordance with embodiments described herein.

FIG. 2 is a flowchart 200 showing steps performed by a target system receiving a validation of a user's identity in accordance with embodiments described herein.

At step 205, a target system 120 receives a first private key 145 from either a user 105 seeking access to the target the system 120 or from an initial system 110 associated with the user 105. At step 210, the target system 120 validates the user's access to the target system 210 based on the first private key 145 and a first public key 140-2 accessible by the target system 120.

At step 215, the target system 120 transmits a request 150-2 for a validation of user identity to a verification system 125 which stores a second public key 135 that is inaccessible to the user.

In response to the request 150-2, the verification system 125 requests a second private key 130 from the initial system 110. The verification system 125 receives the second private key 130 from the initial system 110 and validates the user's 105 identity based on the second private key 130 and the second public key 135. The verification system 125 transmits the validation of user identity 160-2 to the target system 120.

At step 220, the target system 120 receives the validation of user identity 160-2 from the verification system 125.

Figure 3:
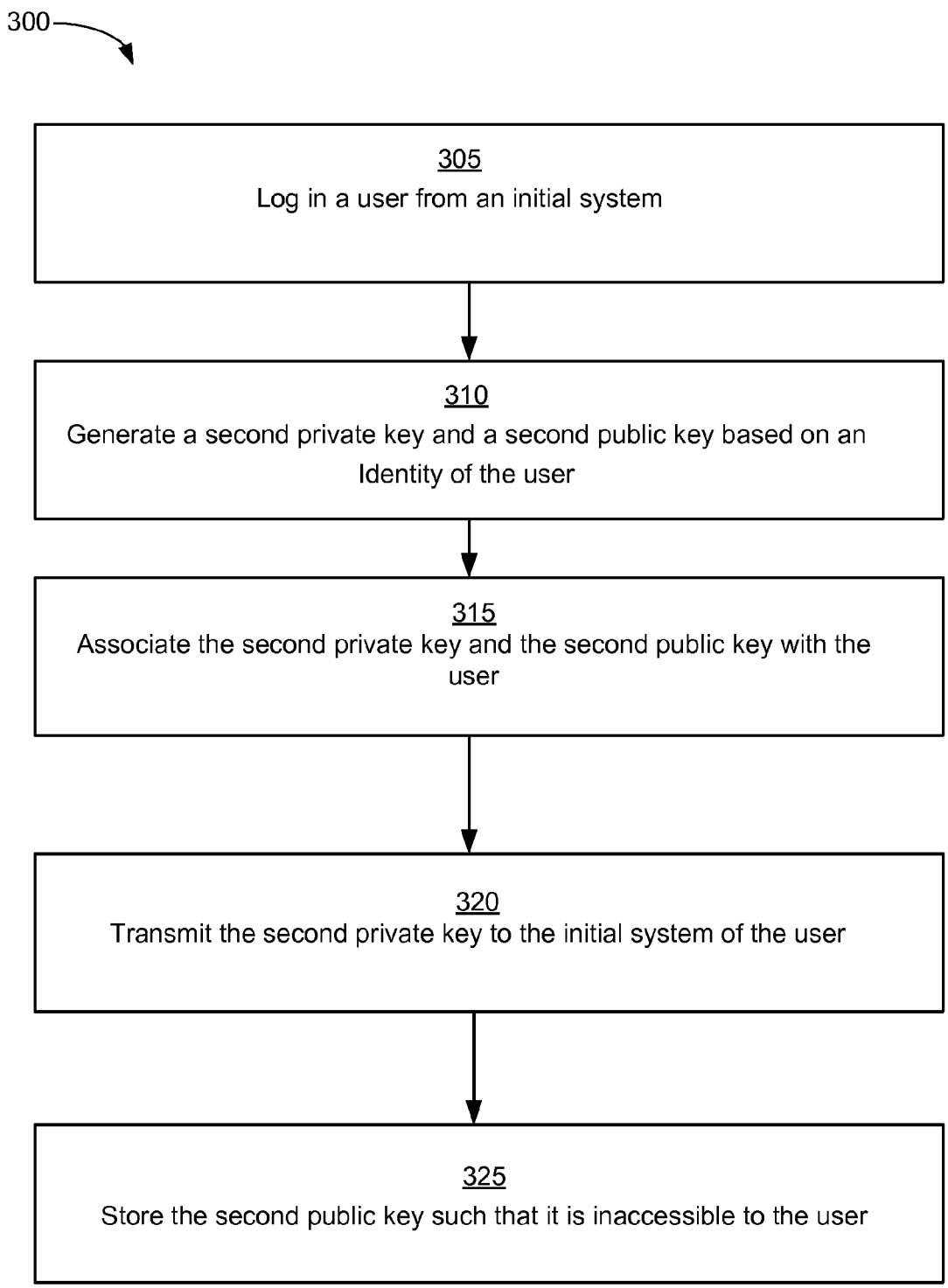
FIG. 3 is a flowchart showing steps performed by a verification system generating a private key and public key based on an identity of a user in accordance with embodiments described herein.

FIG. 3 is a flowchart 300 showing steps performed by a verification system generating a private key and public key based on an identity of a user in accordance with embodiments described herein.

At step 305, the user 105 logs into the verification system 125 from the initial system 110. At step 310, the verification system 125 generates a second private key 130 and a second public key 135 based on an identity of the user 105. At step 315, the verification system 125 associates the second private key 130 and the second public key 135 with the user 105.

At step 320, the verification system 125 transmits the second private key 130 to the initial system 110 of the user. At step 325, the verification system 125 stores the second public key 135 such that it is inaccessible to the user 105.

Figure 4:
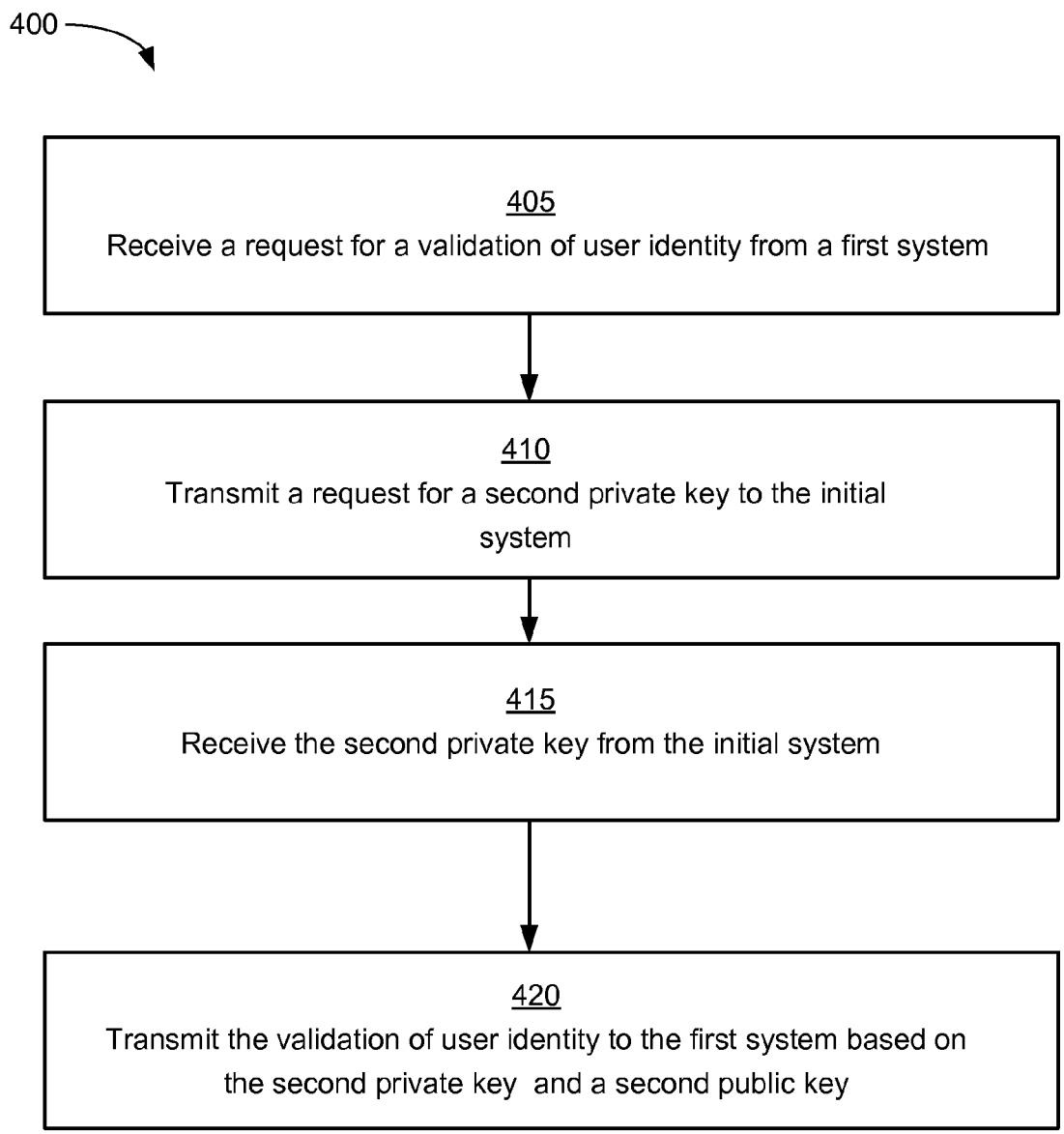
FIG. 4 is a flowchart showing steps performed by a verification system transmitting a validation of user identity in accordance with embodiments described herein.

FIG. 4 is a flowchart 400 showing steps performed by a verification system transmitting a validation of user identity in accordance with embodiments described herein.

At step 405, the verification system 125 receives a request 150-1 for a validation of user identity 160-1 from the first system 115. At step 410, the verification system 125, transmits a request for the second private key 130 to the initial system 110.

At step 415, the verification system 125 receives the second private key 130 from the initial system 110. At step 420, the verification system 125 transmits the validation of user identity 160-1 to the first system 115 based on the second private key 130 and the second public key 135.

For purposes of the present disclosure, it is understood that the terms "system," "server," "computing environment," and "segment within a cloud computing environment" can be used interchangeably.

Figure 5:
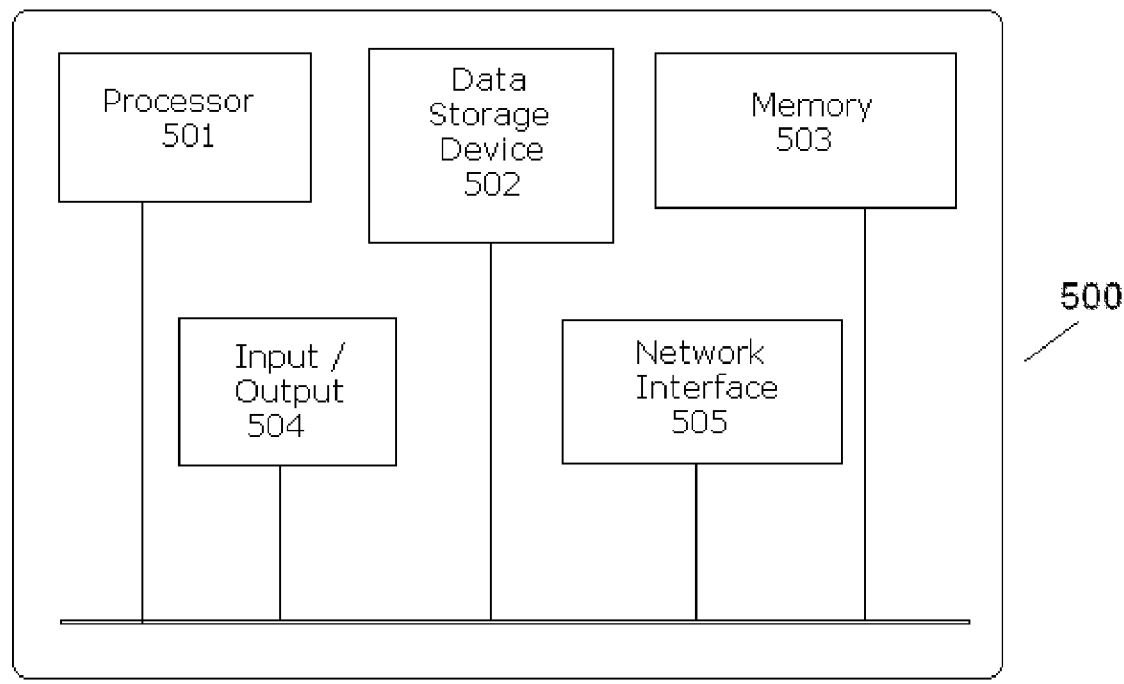
FIG. 5 is a high-level block diagram of an exemplary computer that may be used for implementing one or more embodiments of user identity verification as described herein.

FIG. 5 is a high-level block diagram of an exemplary computer that may be used for implementing one or more aspects of user identity verification as described herein. Computer 500 comprises a processor 501 operatively coupled to a data storage device 502 and a memory 503. Processor 501 controls the overall operation of computer 500 by executing computer program instructions that define such operations. The computer program instructions may be stored in data storage device 502, or other computer readable medium, and loaded into memory 503 when execution of the computer program instructions is desired. Thus, the steps of FIGS. 2, 3, and/or 4 can be defined by the computer program instructions stored in memory 503 and/or data storage device 502 and controlled by processor 501 executing the computer program instructions.

The computer program instructions can be implemented as computer executable code programmed by one skilled in the art to perform an algorithm defined by the method steps of FIGS. 2, 3 and/or 4. Accordingly, by executing the computer program instructions, the processor 501 executes an algorithm defined by the method steps of FIGS. 2, 3 and/or 4. Computer 500 also includes one or more network interfaces 505 for communicating with other devices via a network. Computer 500 also includes one or more input/output devices 504 that enable user interaction with computer 500 (e.g., display, keyboard, mouse, speakers, buttons, etc.).

Processor 501 may include both general and special purpose microprocessors, and may be the sole processor or one of multiple processors of computer 500. Processor 501 may comprise one or more central processing units (CPUs), for example. Processor 501, data storage device 502, and/or memory 503 may include, be supplemented by, or incorporated in, one or more application-specific integrated circuits (ASICs) and/or one or more field programmable gate arrays (FPGAs).

Data storage device 502 and memory 503 each comprise a tangible non-transitory computer readable storage medium. Data storage device 502, and memory 503, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 505 may include peripherals, such as a printer, scanner, display screen, etc. For example, input/output devices 504 may include a display device such as a cathode ray tube (CRT), plasma or liquid crystal display (LCD) monitor for displaying information to the user, a keyboard, and a pointing device such as a mouse or a trackball by which the user can provide input to computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
receiving, by a server, an electronic login request associated with a user of a first device;
generating, by the server, a first key pair in response to the electronic login request, the first key pair associated with an identity of the user;
receiving, by the server, an electronic user identification request associated with a second device, the electronic user identification request seeking a verification of the identity purported to be the user accessing the second device using a second key pair;
retrieving, by the server, the first key pair; and
verifying, by the server, the identity of the user accessing the second device based on the first key pair.

2. The method of claim 1, further comprising sending the first key pair to a network address associated with the first device.

3. The method of claim 1, further comprising querying the first device for the first key pair.

4. The method of claim 1, further comprising receiving the second key pair.

5. The method of claim 1, further comprising comparing the first key pair to the second key pair.

6. The method of claim 1, further comprising determining a match between the first key pair and the second key pair.

7. The method of claim 1, further comprising determining a private key of the first key pair, the private key only accessible to the server.

8. A system, comprising:
a hardware processor; and
a memory device, the memory device storing code, the code when executed causing the hardware processor to perform operations, the operations comprising:
receiving an electronic login request associated with a user of a first device;
generating a first key pair in response to the electronic login request, the first key pair associated with an identity of the user;
receiving an electronic user identification request associated with a second device, the electronic user identification request seeking verification of the identity purported to be the user accessing the second device using a second key pair;
retrieving the first key pair; and
verifying the identity of the user accessing the second device based on the first key pair.

9. The system of claim 8, wherein the operations further comprise sending the first key pair to a network address associated with the first device.

10. The system of claim 8, wherein the operations further comprise querying the first device for the first key pair.

11. The system of claim 8, wherein the operations further comprise receiving the second key pair.

12. The system of claim 8, wherein the operations further comprise comparing the first key pair to the second key pair.

13. The system of claim 8, wherein the operations further comprise determining a match between the first key pair and the second key pair.

14. The system of claim 8, wherein the operations further comprise determining a private key of the first key pair, the private key only accessible to the system.

15. A memory device storing instructions that when executed cause a hardware processor to perform operations, the operations comprising:
receiving an electronic login request associated with a user of a first device;
generating a first key pair in response to the electronic login request, the first key pair associated with an identity of the user;
receiving an electronic user identification request associated with a second device, the electronic user identification request seeking verification of the identity purported to be the user accessing the second device using a second key pair;
retrieving the first key pair; and
verifying the identity of the user accessing the second device based on the first key pair.

16. The memory device of claim 15, wherein the operations further comprise sending the first key pair to a network address associated with the first device.

17. The memory device of claim 15, wherein the operations further comprise querying the first device for the first key pair.

18. The memory device of claim 15, wherein the operations further comprise receiving the second key pair.

19. The memory device of claim 15, wherein the operations further comprise comparing the first key pair to the second key pair.

20. The memory device of claim 15, wherein the operations further comprise determining a match between the first key pair and the second key pair.

* * * * *